US005738325A

United States Patent [19]
Brown

[11] Patent Number: 5,738,325
[45] Date of Patent: Apr. 14, 1998

[54] COMPUTER MOUSE PAD APPARATUS

[75] Inventor: Matthew P. Brown, Shelbyville, Ind.

[73] Assignee: Williams Industries, Inc.

[21] Appl. No.: 377,515

[22] Filed: Jan. 24, 1995

[51] Int. Cl.$^6$ ................................................. A47G 23/00
[52] U.S. Cl. ................................. 248/346.01; 248/205.3; 248/918
[58] Field of Search ..................... 248/346.01, 346.11, 248/918, 118, 118.1, 118.3, 118.5, 205.3

[56] References Cited

U.S. PATENT DOCUMENTS

| | | |
|---|---|---|
| 3,040,472 | 6/1962 | Miller ........................... 248/346.11 |
| 3,173,826 | 3/1965 | Campbell et al. . |
| 3,725,188 | 4/1973 | Kalt . |
| 4,048,363 | 9/1977 | Langer et al. . |
| 4,525,398 | 6/1985 | Rooklyn . |
| 4,783,354 | 11/1988 | Fagan . |
| 4,799,054 | 1/1989 | House . |
| 4,988,301 | 1/1991 | Kinberg . |
| 5,208,084 | 5/1993 | Rutz . |
| 5,358,208 | 10/1994 | Moseley, III et al. . |
| 5,405,168 | 4/1995 | Holt ..................................... 281/2 |
| 5,413,302 | 5/1995 | Ferster ............................ 248/346.11 |

*Primary Examiner*—Ramon O. Ramirez
*Assistant Examiner*—Derek J. Berger
*Attorney, Agent, or Firm*—Barnes & Thornburg

[57] ABSTRACT

An apparatus is provided for facilitating operation of a computer input device which includes a tracking member. The apparatus includes a sheet having a top surface configured to engage the tracking member and a bottom surface, and a double sided tape having a permanent adhesive on a first side surface and a removable adhesive on a second side surface. The first side surface of the barrier is affixed to the bottom surface of the sheet by the permanent adhesive, and the removable adhesive is exposed to secure the sheet to a support surface. A cover is located over the removable adhesive on the second surface of the double sided tape to protect the removable adhesive.

12 Claims, 2 Drawing Sheets

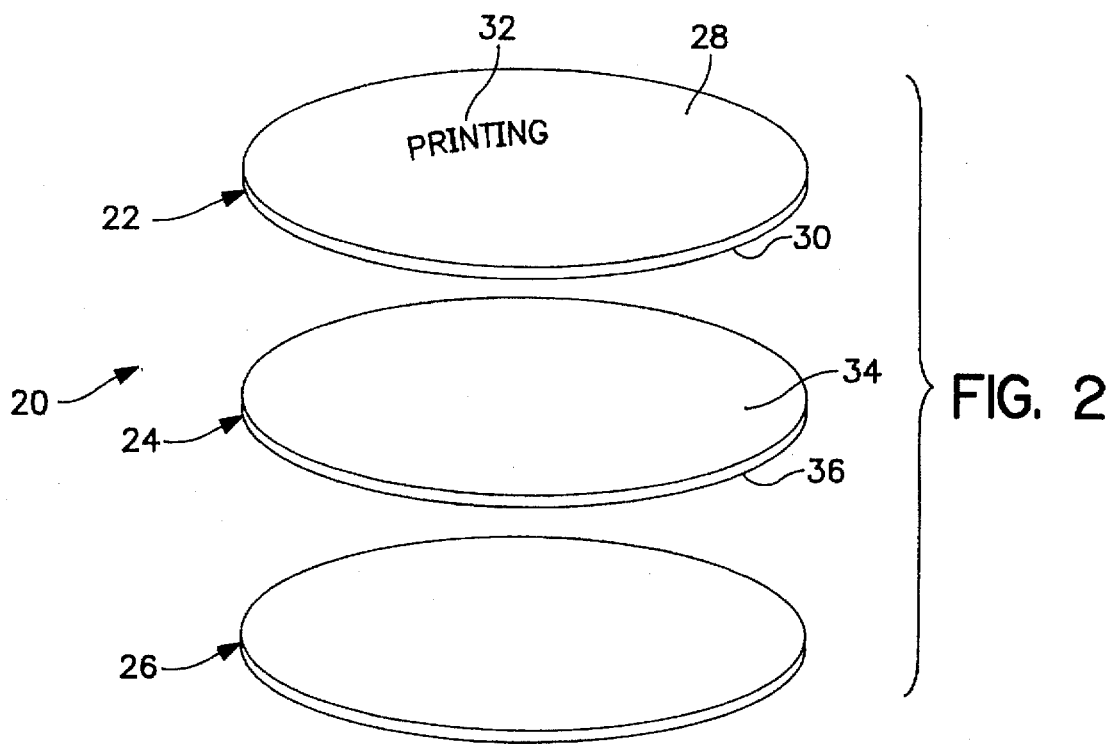
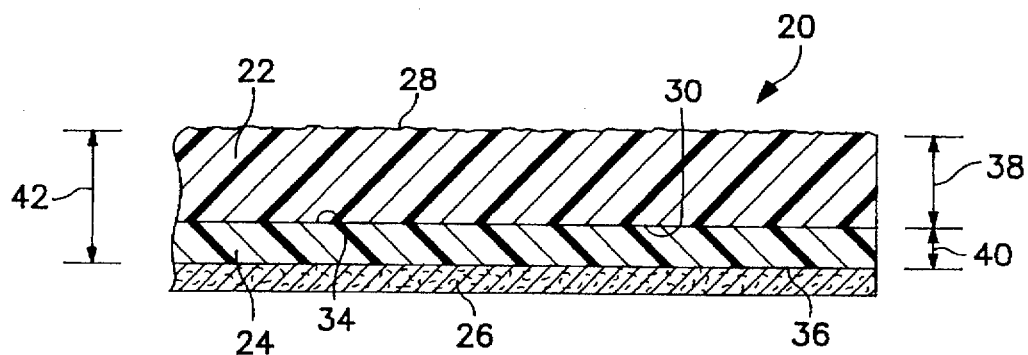
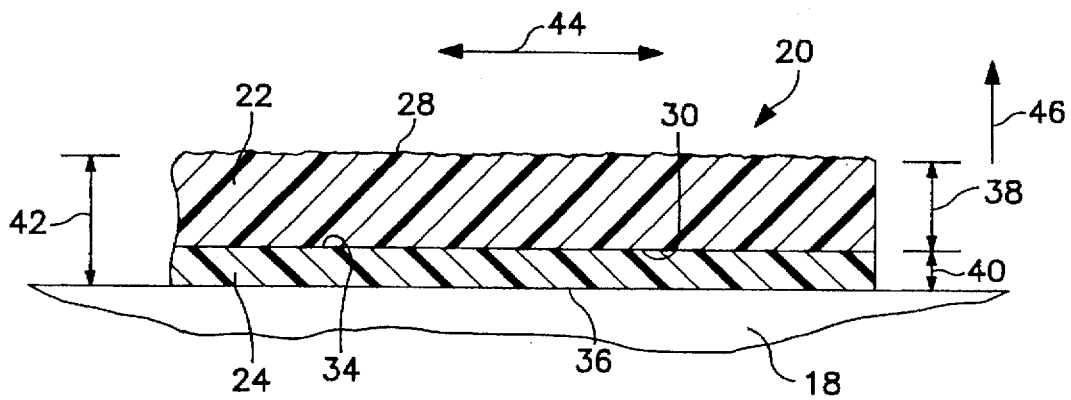

COMPUTER MOUSE PAD APPARATUS

BACKGROUND AND SUMMARY OF THE INVENTION

The present invention relates to an apparatus for facilitating operation of a computer input device which includes a tracking member. More particularly, the present invention relates to an improved computer mouse pad apparatus to facilitate use of a computer mouse by an operator.

Personal computers are now widespread in both businesses and homes. Almost every personal computer now includes a computer "mouse" which is used as a computer input device to facilitate operation of the computer. A mouse includes a tracking member such as a track ball which allows the user to control movement of a cursor on a computer screen. As a user moves the mouse, the track ball makes contact with a table or other support surface and rotates as the mouse moves. If the support surface includes imperfections or is too slick to rotate the track ball, tracking with the mouse may be difficult. Therefore, it is known to provide a computer "mouse pad" to facilitate operation of the mouse. Such mouse pads typically include a textured top surface to provide a frictional surface for gripping and rotating the track ball of the mouse. A typical bottom surface includes a gripping surface made of rubber or the like to reduce the likelihood that the mouse pad will slide on the support surface.

The present invention advantageously provides an improvement over conventional rubber backings available on mouse pads. Advantageously, a light tack removable adhesive is provided on a bottom surface of the computer mouse pad apparatus of the present invention. This light tack removable adhesive advantageously holds the computer mouse pad in a precise location on the support surface of a computer table, desk, or other item. The light tack adhesive is strong enough to hold the mouse pad in position on the support surface but which does not leave a sticky residue which can mar the support surface. The computer mouse pad of the present invention is made of a clear or natural, extruded or calendared thermoplastic sheet having a smooth bottom surface and a rough top surface for operating the computer mouse tracking member. The bottom side surface of the sheet can be printed or laminated with desired art work. The bottom side surface of the sheet is then preferably covered with a colored barrier which can either be printed on or laminated to the bottom side surface. A light tack removable adhesive is then applied to the barrier. The light tack adhesive prevents the computer mouse pad of the present invention from moving while the computer mouse is operated. The light tack adhesive has a removable quality which allows the computer mouse pad of the present invention to be easily removed and relocated to another position without leaving a sticky residue. The barrier between the bottom surface of the thermoplastic sheet is provided for aesthetics. The total thickness of the computer mouse pad is advantageously less than or equal to about 0.015 inch.

The light tack adhesive is illustratively applied to the bottom surface of the mouse pad by a double coated tape. A first side of the double coated tape is attached to the bottom surface of the thermoplastic sheet with a permanent adhesive and the second side of the double coated tape includes an exposed light tack adhesive.

The computer mouse pad of the present invention is constructed by first reverse printing art work or other visual indicia on the smooth bottom surface of the thermoplastic sheet. Such reverse printing allows the art work to be right-reading through the top surface of the thermoplastic sheet as viewed by the user. Such bottom side printing also protects the ink used in the printing process. Next, the double coated tape is mounted to the smooth bottom surface of the thermoplastic sheet with the permanent adhesive side of the double coated tape facing the bottom surface. This exposes the non-permanent, removable adhesive. The light tack, removable adhesive is covered with a protective sheet or cover until it is desired to be used. This cover is easily removed to expose the light tack adhesive. The mouse pad can then be placed on the support surface at a desired location. The light tack removable adhesive holds the mouse pad in position while permitting the mouse pad to be removed without marring the surface and placed in a different location. Advantageously, the light tack adhesive holds the very thin mouse pad in position on the support surface to control operation of the mouse.

According to one aspect of the present invention, an apparatus is provided for facilitating operation of a computer input device which includes a tracking member. The apparatus includes a sheet having a top surface configured to engage the tracking member and a bottom surface, and a removable adhesive located on the bottom surface of the sheet to secure the sheet to a support surface.

In the illustrated embodiment, the apparatus includes a cover located over the removable adhesive on the bottom surface of the sheet to protect the removable adhesive. The sheet has a thickness of about 0.01 inch. The sheet is made from a thermoplastic material.

Also in the illustrated embodiment, a visual indicia is reverse printed on the bottom surface of the sheet under the removable adhesive. This permits the visual indicia to be readable through the top surface of the sheet.

According to another aspect of the present invention, an apparatus is provided for facilitating operation of a computer input device which includes a tracking member. The apparatus includes a sheet having a top surface configured to engage the tracking member and a bottom surface, and a double coated tape having a permanent adhesive on a first side surface and a removable adhesive on a second side surface. The first side surface of the double coated tape is affixed to the bottom surface of the sheet by the permanent adhesive, and the removable adhesive is exposed to secure the sheet to a support surface.

In the illustrated embodiment, the apparatus includes a cover located over the removable adhesive on the second surface of the double coated tape to protect the removable adhesive. The sheet has a thickness of about 0.01 inch. The sheet and the double sided tape have a total combined thickness of less than or equal to about 0.015 inch.

The apparatus further includes a visual indicia reverse printed on the bottom surface of the sheet under the double coated tape. This permits the visual indicia to be readable through the top surface of the sheet.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which:

FIG. 2 is an exploded perspective view of the improved computer mouse pad of the present invention; and FIG. 3 is an enlarged partial sectional view taken through the computer mouse pad of the present invention; and FIG. 4 is an enlarged partial sectional view similar to FIG. 3 illustrating the computer mouse pad of the present invention positioned on a support surface.

DETAILED DESCRIPTION OF DRAWINGS

Figure 1:
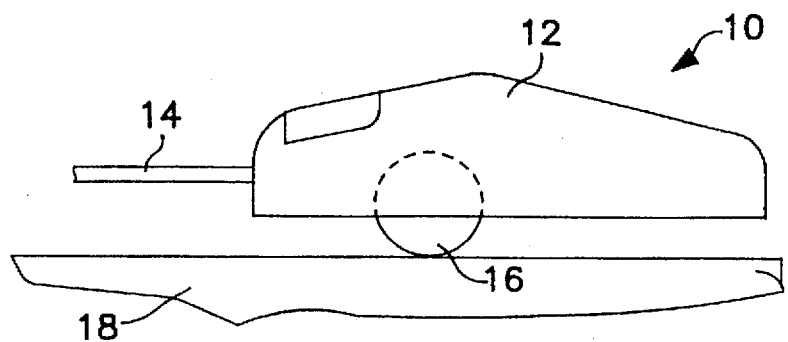
FIG. 1 is a side elevational view of a computer mouse input device including a track ball.

Referring now to the drawings, FIG. 1 illustrates a conventional computer mouse input device 10 having a body portion 12 and a signal line 14 configured to be coupled to a computer (not shown). Mouse 10 includes a track ball 16 which makes a contact with a support surface 18 and rolls as mouse body 12 is moved across the surface 18. Therefore, linear movement of mouse body 12 is translated into rotation of track ball 16. If the support surface 18 is slick or includes imperfections or dirt, operation of mouse 10 can be impaired. Rotation of track ball 16 is converted into an electrical signal which is transmitted through signal line 14 in a conventional manner.

FIG. 2 illustrates an improved computer mouse pad 20 of the present invention. Mouse pad 20 includes three separate layers 22, 24, and 26. The first layer 22 is made of a clear or natural colored, extruded or calendared thermoplastic sheet 22. The thermoplastic sheet 22 includes a rough top surface 18 for gripping and operating track ball 16 of mouse 10. Thermoplastic sheet 22 also includes a bottom smooth side surface 30. Smooth bottom surface 30 permits reverse printing on bottom surface 30 which is visible through top surface 28 as illustrated by the visual indicia 32 of FIG. 2. Mouse pad 20 also includes a double coated tape layer 24 having a first top surface 34 coated with a permanent adhesive and a second, bottom surface 36 coated with a light tack, removable adhesive. The light tack, removable adhesive prevents the mouse pad 20 from moving while the mouse 10 is being operated by engaging and gripping top surface 28. In other words, without the light tack, removable adhesive, the thin thermoplastic printed sheet is likely to slide on surface 18 during movement of mouse 10. Preferably, layer 24 is a white or other colored barrier for aesthetics to cover and protect the printing on bottom surface 30 of thermoplastic sheet 22. A suitable cover layer 26 is provided to cover the removable adhesive on surface 36 of barrier 24 until it is desired to position the mouse pad 20 on support surface 18.

FIG. 3 illustrates further details of the computer mouse pad 20 of the present invention. FIG. 3 illustrates the permanent adhesive side surface 34 of barrier 24 coupled to the reverse printed smooth bottom printed surface 30 of thermoplastic sheet 22. The removable adhesive on second side surface 36 of barrier 24 is covered by cover 26. In the illustrated embodiment, thermoplastic sheet 22 is illustratively a 0.010 inch scuff resistant rigid vinyl material available from Tekra Corporation located in New Berlin, Wis. Therefore, top layer 22 preferably has a thickness illustrated by dimension 38 of about 0.010 inch. Also illustratively, barrier layer 24 is a double coated tape which includes a white polystyrene carrier 24 having a full permanent acrylic adhesive on first side surface 34 facing bottom surface 30 of thermoplastic sheet 22 and a full removable acrylic adhesive on surface 36 of barrier 24. Such barrier 24 with permanent and removable adhesives is a model number 1100 available from MacTac, Inc. located in Stow, Ohio. Illustratively, barrier 24 has a thickness of about 0.002 inch as illustrated by dimension 40 in FIG. 3. The total combined thickness of thermoplastic sheet 22 and barrier 24 as illustrated by dimension 42 is preferably about 0.015 inch or less.

The removable adhesive may include a mixture of pressure sensitive adhesive and wax. The particular amounts of each will be dependent upon the release characteristics of the wax and the strength of the adhesive. It is understood that the removable adhesive may be applied directly to the bottom surface 30 of sheet 22 without the use of barrier 24.

As discussed above, the computer mouse pad 20 is formed by obtaining the extruded thermoplastic sheet 22 having a rough top surface 28 and a smooth bottom surface 30. Next, the desired visual indicia 32 is reverse printed on smooth bottom surface 30 of sheet 22. Such reverse printing allows the art work 32 to be right-reading through top surface 28 of mouse pad 20. Next, the barrier 24 is mounted to bottom surface 30 such that permanent adhesive on first side surface 34 is affixed to bottom surface 30 of sheet 22. Once it is desired to use mouse pad 20, protective cover 26 is removed and mouse pad 20 is positioned at the desired location on the support surface 18 with the removable adhesive on surface 36 engaging surface 18 as illustrated in FIG. 4. The light tack removable adhesive is advantageously removable from surface 18 without marring surface 18 or leaving a sticky residue.

Advantageously, the removable adhesive on bottom surface 36 of barrier 24 resists movement of mouse pad 20 in the directions of double-headed arrow 44 of FIG. 4 in a direction generally parallel to the planar surfaces of sheet 22 and barrier 24. Therefore, mouse pad 20 remains in its desired position on surface 18 during operation of mouse 10. The removable adhesive on surface 36 permits removal of mouse pad 20 from surface 18 when a force is applied generally perpendicular to the planar surfaces of sheet 22 and barrier 24 in the direction of arrow 46 in FIG. 4.

Although the invention has been described in detail with reference to a certain preferred embodiment, variations and modifications exist within the scope and spirit of the present invention as described and defined in the following claims.

What is claimed is:

1. An apparatus for facilitating operation of a computer input device which includes a tracking member, the apparatus comprising:

a sheet made from a thermoplastic material and having a textured top surface configured to grip and operate the tracking member and a bottom surface; and a removable adhesive means located on the bottom surface of the sheet to temporarily secure the sheet to a support surface while permitting relocation and resecurement of the sheet to a support surface.

2. The apparatus of claim 1, further comprising a cover located over the removable adhesive on the bottom surface of the sheet to protect the removable adhesive.

3. The apparatus of claim 1, wherein the sheet has a thickness of about 0.01 inch.

4. The apparatus of claim 1, further comprising a barrier having a permanent adhesive on a first side surface and the removable adhesive on a second side surface, the first side surface of the barrier being affixed to the bottom surface of the sheet by the permanent adhesive.

5. The apparatus of claim 4, wherein the sheet and the barrier have a total combined thickness of less than or equal to about 0.015 inch.

6. The apparatus of claim 4, further comprising a cover located over the removable adhesive on the second side surface of the barrier to protect the removable adhesive.

7. The apparatus of claim 1, further comprising a visual indicia reverse printed on the bottom surface of the sheet under the removable adhesive so that the visual indicia is readable through the top surface of the sheet.

8. An apparatus for facilitating operation of a computer input device which includes a tracking member, the apparatus comprising:

a sheet made from a thermoplastic material and having a top textured surface configured to grip and operate the tracking member and a bottom surface; and a double sided adhesive means having permanent adhesive on a first side surface and a removable adhesive on a second side surface, the first side surface being affixed to the bottom surface of the sheet by the permanent adhesive, and the removable adhesive being exposed to temporarily secure the sheet to a support surface while permitting relocation and resecurement of the sheet to a support surface.

9. The apparatus of claim 8, further comprising a cover located over the removable adhesive on the second surface of the double sided adhesive means to protect the removable adhesive.

10. The apparatus of claim 8, wherein the sheet has a thickness of about 0.01 inch.

11. The apparatus of claim 8, wherein the sheet and the double sided adhesive means have a total combined thickness of less than or equal to about 0.015 inch.

12. The apparatus of claim 8, further comprising a visual indicia reverse printed on the bottom surface of the sheet under the double sided tape so that the visual indicia is readable through the top surface of the sheet.

* * * * *